US009105145B2

(12) United States Patent
Brown et al.

(10) Patent No.: US 9,105,145 B2
(45) Date of Patent: *Aug. 11, 2015

(54) COMMERCIAL CURRENCY HANDLING AND SERVICING MANAGEMENT (75) Inventors: Brian Duane Brown, Matthews, NC (US); Anthony B. Calderone, Matthews, NC (US); Henry W. Debnam, Waxhaw, NC (US); Shane Anthony Johnson, Charlotte, NC (US); Bethann Johnston, Atlanta, GA (US); Michelle Davis Nichols, Rock Hill, SC (US); John Daniel Shaver, Charlotte, NC (US); John N. Venzon, Davidson, NC (US); John Scott Walbert, Mooresville, NC (US); Margaret Morgan Weichert, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 837 days.

This patent is subject to a terminal disclaimer.

(21) Appl. No.: 12/559,993

(22) Filed: Sep. 15, 2009

(65) Prior Publication Data

US 2010/0070392 A1  Mar. 18, 2010

Related U.S. Application Data (63) Continuation of application No. 11/614,656, filed on Dec. 21, 2006, now Pat. No. 7,635,085.

(51) Int. Cl.
G06Q 40/00 (2012.01)
G07F 19/00 (2006.01)
G06Q 20/04 (2012.01)
(Continued)

(52) U.S. Cl.
CPC ............ *G07F 19/202* (2013.01); *G06Q 20/042* (2013.01); *G06Q 20/108* (2013.01); *G06Q 20/1085* (2013.01); *G06Q 20/40* (2013.01);
(Continued)

(58) Field of Classification Search
USPC ................. 235/379, 381, 383; 705/32, 39–45
See application file for complete search history.

(56) References Cited

U.S. PATENT DOCUMENTS

| 4,542,287 A | 9/1985 | Watanabe |
| 6,607,124 B1 | 8/2003 | Junkins et al. |

(Continued)

FOREIGN PATENT DOCUMENTS

| EP | 1486923 A2 | 12/2004 |
| EP | 1486923 A3 | 12/2004 |

(Continued)

OTHER PUBLICATIONS

International Search Report and Written Opinion for International Application No. PCT/US2007/088650 mailed Sep. 16, 2008, 10 pages.

(Continued)

*Primary Examiner* — Tuyen K Vo
(74) *Attorney, Agent, or Firm* — Banner & Witcoff, Ltd.; Michael A. Springs (57) ABSTRACT Aspects of the invention provide for an end-to-end currency handling, and servicing apparatus. The apparatus may be used in any cash-centric business or enterprise for cash register till set up and balancing, back office reconciliation, and other cash payment handling activities. Further aspects of the invention provide real-time access to cash receipts for enterprise use in making financial and planning decisions.

7 Claims, 13 Drawing Sheets (51) Int. Cl.
*G06Q 20/10* (2012.01)
*G06Q 20/40* (2012.01)

(52) U.S. Cl.
CPC .............. *G06Q 40/12* (2013.12); *G07F 19/20* (2013.01); *G07F 19/211* (2013.01)

(56) References Cited

U.S. PATENT DOCUMENTS

| | | | |
|---|---|---|---|
| 6,848,612 | B2 | 2/2005 | Uematsu et al. |
| 6,983,836 | B2 | 1/2006 | Adams et al. |
| 7,014,105 | B2 | 3/2006 | Fujioka |
| 7,036,722 | B2 | 5/2006 | Fujioka |
| 7,213,745 | B2 | 5/2007 | Smith et al. |
| 7,328,844 | B2 | 2/2008 | Workens |
| 7,350,699 | B2 | 4/2008 | Gunst et al. |
| 7,481,360 | B1 | 1/2009 | Ramachandran et al. |
| 7,523,856 | B2 | 4/2009 | Block et al. |
| 7,681,707 | B2 | 3/2010 | Tabachnik |
| 7,873,576 | B2 | 1/2011 | Jones et al. |
| 2001/0020638 | A1 | 9/2001 | Uematsu et al. |
| 2001/0054643 | A1 | 12/2001 | Siemens |
| 2002/0011393 | A1* | 1/2002 | Siemens ............ 194/215 |
| 2003/0061162 | A1* | 3/2003 | Matthews .......... 705/41 |
| 2003/0080185 | A1 | 5/2003 | Werther |
| 2003/0083969 | A1 | 5/2003 | Uchiyama et al. |
| 2003/0191708 | A1 | 10/2003 | Turk |
| 2003/0196936 | A1 | 10/2003 | Graef et al. |
| 2004/0039702 | A1 | 2/2004 | Blair et al. |
| 2004/0059634 | A1 | 3/2004 | Tami et al. |
| 2004/0107170 | A1 | 6/2004 | Labrou et al. |
| 2004/0153408 | A1 | 8/2004 | Jones et al. |
| 2005/0049950 | A1 | 3/2005 | Johnson |
| 2005/0080731 | A1 | 4/2005 | Dnyaneshwar |
| 2005/0108164 | A1 | 5/2005 | Salafia et al. |
| 2005/0278239 | A1 | 12/2005 | Jones et al. |
| 2006/0016884 | A1 | 1/2006 | Block et al. |
| 2006/0022032 | A1 | 2/2006 | Fillinger et al. |
| 2007/0005467 | A1 | 1/2007 | Haigh et al. |
| 2007/0045395 | A1 | 3/2007 | Corona et al. |
| 2007/0063016 | A1 | 3/2007 | Myatt et al. |
| 2007/0240966 | A1 | 10/2007 | Tabachnik |
| 2008/0149706 | A1 | 6/2008 | Brown et al. |
| 2008/0265019 | A1* | 10/2008 | Artino et al. .......... 235/379 |
| 2009/0289105 | A1 | 11/2009 | Block et al. |
| 2009/0320106 | A1 | 12/2009 | Jones et al. |
| 2010/0010904 | A1 | 1/2010 | Sanders et al. |
| 2010/0051687 | A1 | 3/2010 | Jones et al. |
| 2010/0057617 | A1 | 3/2010 | Jones et al. |
| 2010/0063916 | A1 | 3/2010 | Jones et al. |
| 2010/0092065 | A1 | 4/2010 | Jones et al. |
| 2010/0198708 | A1 | 8/2010 | Tabachnik |
| 2010/0299257 | A1 | 11/2010 | Turk |

FOREIGN PATENT DOCUMENTS

| | | |
|---|---|---|
| EP | 1517274 A2 | 3/2005 |
| JP | 2000-137869 A | 5/2000 |
| JP | 2004-30270 A | 1/2004 |
| JP | 2004-192587 A | 7/2004 |
| JP | 2005-284649 A | 10/2005 |
| JP | 2006-079493 A | 3/2006 |
| JP | 2006268605 A | 10/2006 |
| WO | 2005-038623 A2 | 4/2005 |
| WO | 2005038623 A2 | 4/2005 |

OTHER PUBLICATIONS

International Preliminary Report on Patentability for International Application No. PCT/US2007/088650 dated Jun. 24, 2009, 6 pages.
European Office Action for Application No. 07865976.0, dated Oct. 15, 2009, 4 pages.
Non-final office action for U.S. Appl. No. 12/241,385, mailed Aug. 18, 2010.
European Office Action for application No. 07865976.0, mailed May 12, 2010.
First Office Action from The Patent office of the People's Republic of China mailed Jun. 28, 2010, 10 pages.
Search Report and Written Opinion for International Application No. PCT/US09/58772, mailed Sep. 30, 2010, 8 pages.
Final Office Action for U.S. Appl. No. 12/241,385 mailed Feb. 3, 2011.
The Second Office Action for Chinese patent application No. 200780051569.9 mailed Jun. 29, 2011.
Office Action dated Mar. 19, 2013, in Japanese Application No. 2009-543274 and English translation thereof.
Translation of Japanese Office Action for JP Patent Application No. 2009-543274 dated Nov. 20, 2012.
Summons to Attend Oral Proceedings Pursuant to Rule 115(1) EPC dated Feb. 2, 2013 in European Application No. 07865976.0.
Office Action dated Dec. 14, 2012 in Mexican Application No. MX/a/2009/006682.
Canadian Office Action dated Jan. 21, 2014 in Canadian Application No. 2,673,300.
Apri 2, 2015 (CA) Canadian Office Action—App No. 2,673,300.
PRNewswire-FirstCall, "Wells Fargo Makes ATM Deposits Faster and Easier," Wells Fargo & Company, retrieved from http://www.prnewswire.cominews-releases/wells-fargo-makes-atm-deposits-faster-and-easier-56557102.html, May 25, 2006.

* cited by examiner

Display / print ATS Totals

| ID | Denomination | Count | Total | Status |
|---|---|---|---|---|
| G | 0 EUR | 0 | 0 EUR | Not ready, locked |
| H | 0 EUR | 0 | 0 EUR | Not ready, locked |
| F | $100 | 46 | $4,600 | OK |
| E | $50 | 90 | $4,500 | OK |
| D | $20 | 17 | $340 | OK |
| A | $10 | 10 | $100 | OK |
| B | $5 | 23 | $115 | OK |
| C | $1 | 45 | $45 | OK |
| Total Stock in EUR | | 0 | 0,00 EUR | |
| Total Stock in USD | | 231 | $9,700.00 | |

OK

Print

As of 09/05/2006
Innovative Groceries
Current Day Cash Position and Deposit and Report

*Customer Connection ABA: 123456789, US Dollar (USD) Accounts*

100000001 Innovative Grocery Store Sweep Last Updated: 09/05/2006 04:35 CST

| Description | Amount | # of Items | Immediate Availability | 1 Day Float | 2+ Day Float |
|---|---|---|---|---|---|
| AVAILABLE CASH BALANCE | 18000.00 | | | | |
| LAST DEPOSIT TOTAL | 4000.00 | | | | |
| 1 DAY FLOAT | 0.00 | | | | |
| 2 OR MORE DAYS FLOAT | 0.00 | | | | |
| TOTAL CREDITS | 9500.00 | | | | |
| TOTAL DEBITS | 5000.00 | | | | |

100000012 Innovative Grocery Store #001 Last Updated: 09/05/2006 04:35 CST

| Description | Amount | # of Items | Immediate Availability | 1 Day Float | 2+ Day Float |
|---|---|---|---|---|---|
| CASH BOX AVAILABLE BALANCE | 10000.00 | | | | |
| LAST DEPOSIT | 1500.00 | | | | |
| LAST WITHDRAWL | 500.00 | | | | |
| 1 DAY FLOAT | 0.00 | | | | |
| 2 OR MORE DAYS FLOAT | 0.00 | | | | |
| TOTAL CREDITS | 5500.00 | | | | |
| TOTAL DEBITS | 3000.00 | | | | |

DENOMINATION TOTALS

| 100 | 50 | 20 | 10 | 5 | 1 |
|---|---|---|---|---|---|
| 49 | 89 | 20 | 12 | 25 | 5 |

100000013 Innovative Grocery Store #001 Last Updated: 09/05/2006 04:35 CST

| Description | Amount | # of Items | Immediate Availability | 1 Day Float | 2+ Day Float |
|---|---|---|---|---|---|
| CASH BOX AVAILABLE BALANCE | 8000.00 | | | | |
| LAST DEPOSIT | 2500.00 | | | | |
| LAST WITHDRAWL | 200.00 | | | | |
| 1 DAY FLOAT | 0.00 | | | | |
| 2 OR MORE DAYS FLOAT | 0.00 | | | | |
| TOTAL CREDITS | 4000.00 | | | | |
| TOTAL DEBITS | 2000.00 | | | | |

COMMERCIAL CURRENCY HANDLING AND SERVICING MANAGEMENT

CROSS-REFERENCE TO RELATED APPLICATION

This application claims the benefit of priority from and is a continuation of U.S. patent application Ser. No. 11/614,646, filed Dec. 21, 2006, entitled "Commercial Currency Handling and Servicing Management," and now U.S. Pat. No. 7,635,085. The contents of the above application are hereby incorporated by reference in their entirety.

FIELD OF THE INVENTION

Aspects of the disclosure relate to cash handling in a cash-centric environment. More specifically, aspects of the invention relate to real-time access to information regarding cash flows.

BACKGROUND

Cash flow refers to the movement of cash over a particular time period within a business or enterprise. The calculation of cash flow may be used as one measure to gauge financial health of the business. Managers in charge of cash flow management may use various tools to assist in making decisions involving cash flow.

A starting point for proper cash flow management involves use of cash flow projections. Accurate cash flow projections enable business managers to make proper decisions regarding day-to-day operations and long-term strategic decisions such as investment decisions.

Good cash flow projections involve using up-to-date accurate data regarding inflows and outflows of cash over a period of time. These projections which may be in the form of cash flow statements involve estimation of operating cash flow. However, timely up-to-date data concerning operating cash flow is difficult to obtain in large retail operations. In large retail operations, accurate cash flow data may not be known until business close, as an accounting of each cash register's drawer has to be completed and reported to a corporate back office.

For example, a multi-store grocery chain may have multiple cashiers at each store handling numerous customers during a business day. When each store closes or at the end of the cashier's shift, each of the cashiers may have to tally in their cash register so that a final tally may be determined each store closing. At certain time of day the result may be forwarded to a central office which may be used to calculate cash flow for the grocery chain At particular scheduled times which may range from daily to once every few days or longer, an armored car or other means of transportation may be arranged such that cash receipts from the day or some other period of time may be picked up and transferred to a financial center or branch for deposit. Upon delivery to the financial center, cash may be deposited and may be made available for use by the business in another one to four business days.

Therefore, a need exists for a method, apparatus, and system for calculating and allowing use of cash flows for a business or enterprise in real-time. The calculation of real-time cash flows may enable mangers with cash management responsibilities to make informal business decisions regarding use of cash during the same business day for the entire enterprise.

SUMMARY

The following presents a simplified summary in order to provide a basic understanding of some aspects of the invention. The summary is not an extensive overview of the invention. It is neither intended to identify key or critical elements of the invention nor to delineate the scope of the invention. The following summary merely presents some concepts of the invention in a simplified form as a prelude to the description below.

In one aspect of the invention, an end-to-end currency, handling and servicing apparatus is provided to any cash-centric business or enterprise. In various embodiments, the method, apparatus, and system may provide cash register till set up and balancing, back office reconciliation, and other cash payment handling activities.

In an aspect of the invention, a cash recycling apparatus is utilized to receive currency deposits and recycle the deposited currency for withdrawals. In an embodiment, the cash recycling apparatus may scan each deposit for unauthorized reproductions of bills.

In another aspect of the invention, a currency recycling apparatus may be placed in each of a business customer's stores or locations. The currency recycling machines may be networked. In an embodiment, after each cashier shift or at other designated times, contents of a cashier's register till or drawer may be deposited into a currency recycling apparatus. In another embodiment, at shift start the currency recycling apparatus may withdraw a determined amount of cash in various denominations so as to stock a cashier's cash register till or drawer.

Furthermore, in an aspect of the invention contents and data from each of the networked currency recycling machines may be analyzed to determine real-time cash positions. In an embodiment, the real-time cash positions may be used to make projections and/or decisions regarding short and long term business decisions.

In yet another aspect of the invention, each of the currency recycling machines may be connected to a financial institution's network or infrastructure. In an embodiment, each deposit or withdrawal via the currency recycling machine may be credited or debited real-time to a customer's account. In another embodiment, real-time crediting and debiting of a customer's account may allow the customer to have immediate access to the customer's recent deposits and current balance for use in future transactions or for planning and forecasting.

BRIEF DESCRIPTION OF THE DRAWINGS

The present disclosure is illustrated by way of example and not limited in the accompanying figures in which like reference numerals indicate similar elements.

DETAILED DESCRIPTION

In accordance with various aspects of the disclosure, systems and methods are illustrated for providing currency handling services and management. A financial institution such as a bank may provide immediate access and use of funds recently deposited using the currency handling apparatus, system, and method described below in various aspects of the invention. For illustrative purposes the financial instrument discussed throughout the below description is cash. However, as those skilled in the art will realize, the described aspects of the invention are not limited to just cash (paper money and coins) and but may also include other forms of liquid assets such as checks, bank notes, and money orders.

Figure 1:
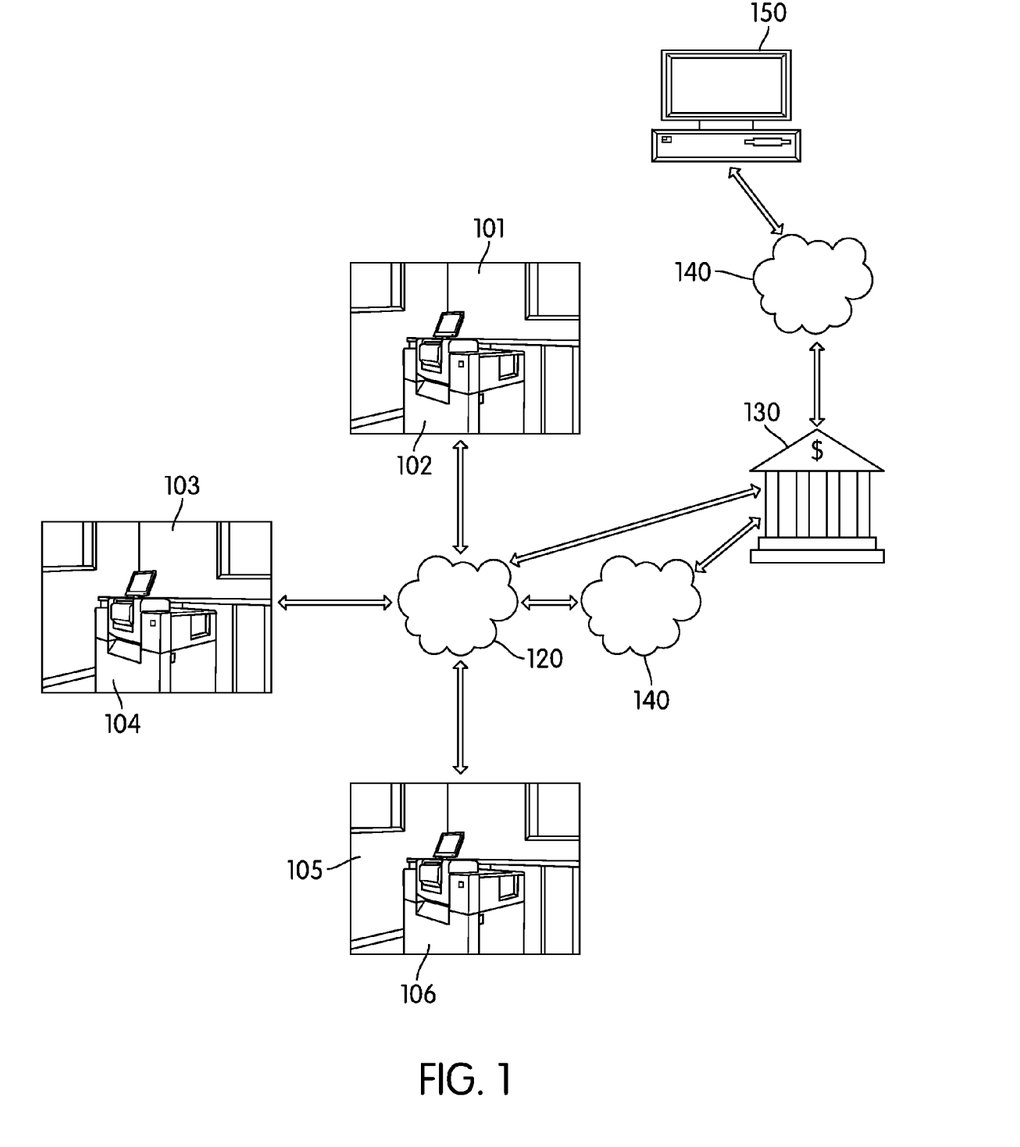
FIG. 1 illustrates an example of a suitable operating environment in which various aspects of the disclosure may be implemented.

FIG. 1 illustrates an example of a suitable operating environment in which various aspects of the disclosure may be implemented. Currency or cash recyclers 102, 104, 106 may be located at various locations such as locations 101, 103, and 105. The locations may represent different stores of a business enterprise. For example, locations 101, 103, and 105 may represent three different grocery stores located in different geographical areas belonging to a grocery chain. Those skilled in the art will realize that additional cash recyclers may be located in same stores or in other stores belonging to the grocery chain. In addition, those skilled in the art will realize that a grocery chain is only one illustrative example of the types of locations that cash recyclers may be located. For example, cash recyclers may also be located in gas stations, post offices, department stores, and other places where cash and other financial instruments are deposited or withdrawn.

FIG. 1 further illustrates that cash recyclers 102, 104, and 106 may be connected to a communications network such as communications network 120. Communications network 120 may represent: 1) a local area network (LAN); 2) a simple point-to-point network (such as direct modem-to-modem connection); and/or 3) a wide area network (WAN), including the Internet and other commercial based network services.

Cash recyclers 102, 104, and 106 may communicate with one another or with a financial institution such as bank 130 via communication network 120 in ways that are well known in the art. The existence of any of various well-known protocols, such as TCP/IP, Ethernet, FTP, HTTP, BLUETOOTH, Wi-Fi, ultra wide band (UWB), low power radio frequency (LPRF), radio frequency identification (RFID), infrared communication, IrDA, third-generation (3G) cellular data communications, Global System for Mobile communications (GSM), or other wireless communication networks or the like may be used as the communications protocol. Communications network 120 may be directly connected to a financial institution such as bank 130. In another embodiment, communications network 120 may be connected to a second network or series of networks 140 before being connected to bank 130.

Figure 2:
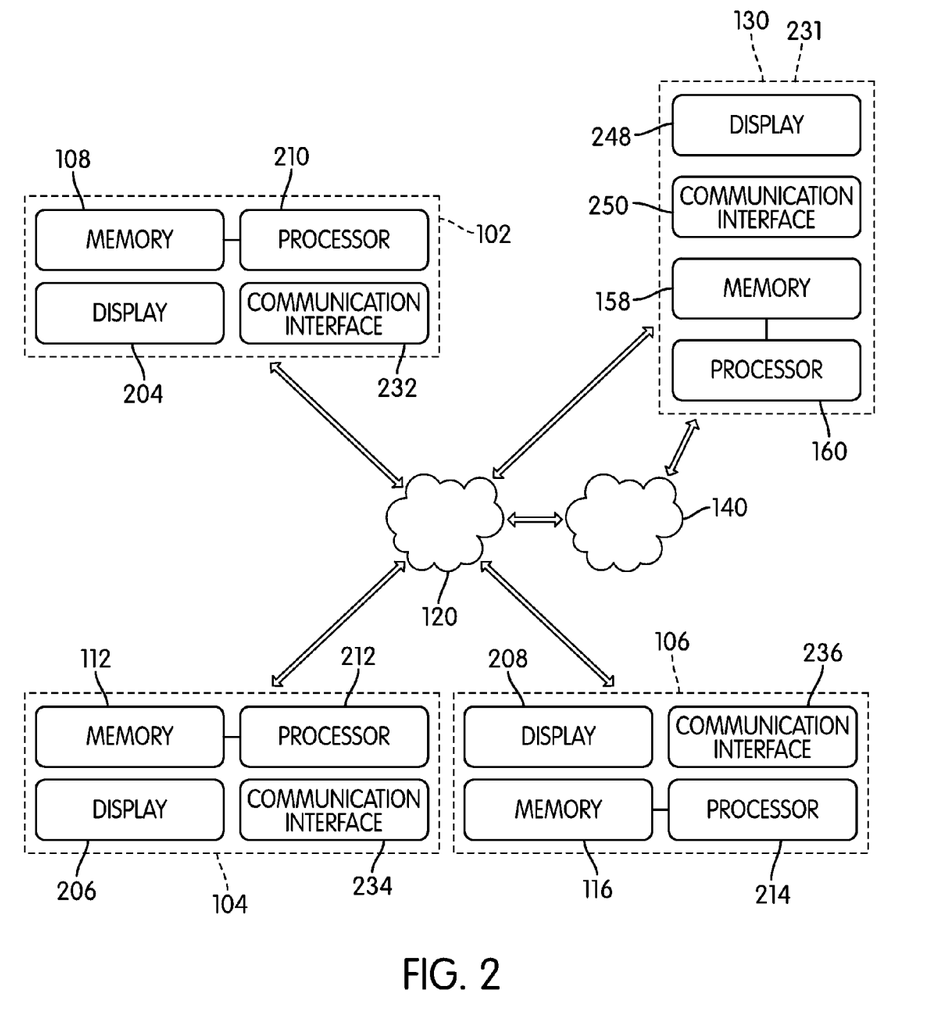
FIG. 2 illustrates a simplified diagram of a currency recycler in accordance with an aspect of the invention.

FIG. 2 illustrates a simplified diagram of a cash recycler in accordance with an aspect of the invention. Cash recyclers may comprise memories (108, 112, and 116) processors (210, 212, and 214), displays (204, 206, and 208), and communication interfaces (232, 234, and 236). The processors 210, 212, and 214 may execute computer-executable instructions present in memory 108, 112, 116 such that, for example, the cash recyclers 102, 104, and 106 may send and receive information to and from bank 130 via network or networks 120 and/or 140. Bank 130 may utilize an infrastructure which includes a server 231 having components such as memory 158, processor 160, display 248, and communication interface 250. The memory for each of the cash recyclers 102, 104, and 106 and server 231 may include non-volatile and/or volatile memory.

Figure 3:
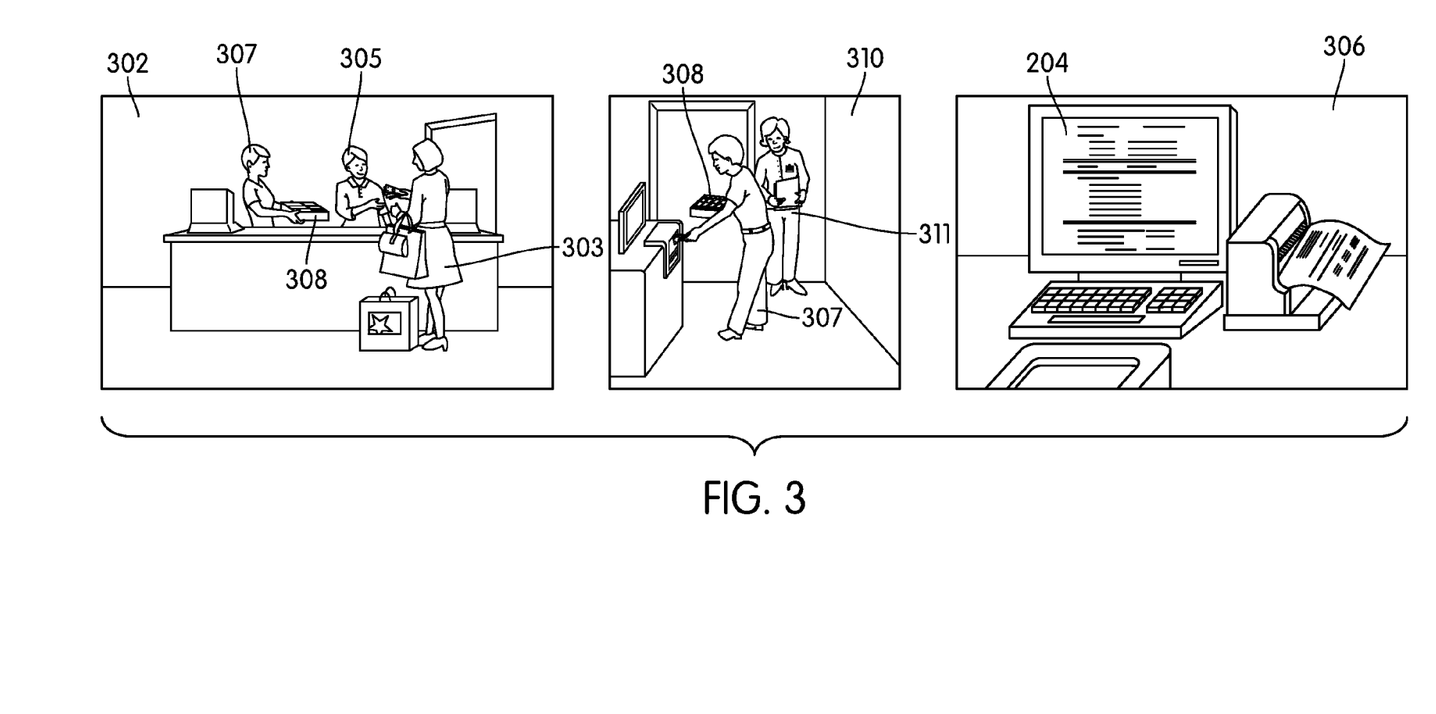
FIG. 3 illustrates various features of a currency recycler that may be used in accordance with aspects of the invention.

FIG. 3 illustrates various features of cash recycler 102 used in various aspects of the invention. The images in FIG. 3 depict use of a single cash recycler 102 in a retail environment. The retail owner may have a cash recycler 102 located in each of their stores. In an aspect of the invention, summary information for the retail owner's stores may be available via an interface to the financial institution. In another embodiment, access to summary information may be available directly from each of the cash recyclers 102.

In FIG. 3, image 302 depicts customer 303 paying cash to store cashier 305 for a purchase. Another store cashier 307 at a recently closed cash register may be carrying a cash drawer or till 308 to a back office for reconciliation. In image 310, store cashier 307 may load currency from cash register till 308 into cash recycler 102. In addition, store cashier 107 may also deposit other paper forms of payment received from customer such as checks. An office manager 311 may be supervising cashier 307 during the loading of cash register till 308 into cash recycler 102. Moreover, upon the start of a shift a cashier may fill his/her cash register till with a designated amount of currency dispensed from cash recycler 102.

In image 306 of FIG. 3, a display screen 204 of cash recycler 102 may show the total amount entered into cash recycler 102 from till 308. The display screen 204 may breakout the amount entered into cash recycler 102 by denomination and by each cashier. The total amount deposited and withdrawn from cash recycler 102 may be shown on display screen 204.

Figure 4:
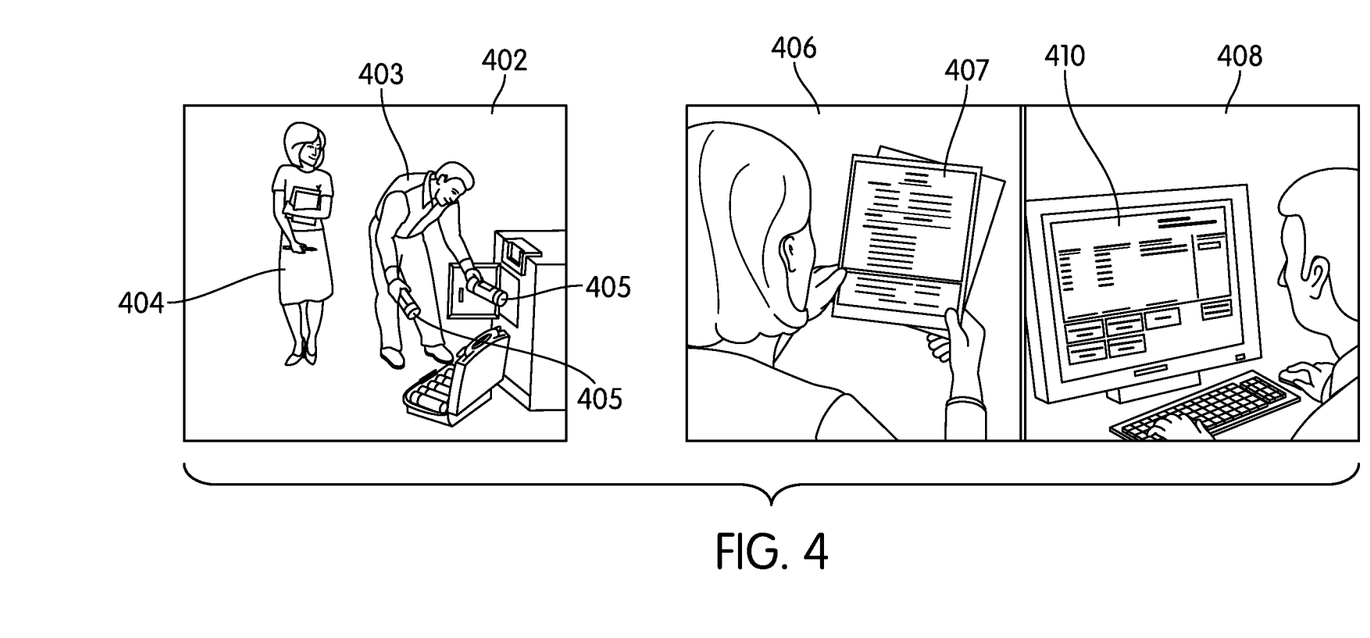
FIG. 4 illustrates additional features of a currency recycler used in various aspects of the invention.

FIG. 4 illustrates additional features of cash recycler 102 used in various aspects of the invention. In image 402 of FIG. 4, an armored car driver 403 may be delivering or picking up currency cylinders 405 from cash recycler 102. The currency cylinders may contain a predetermined amount of currency in various denominations to be used by cash recycler 102. As cash recycler 102 reuses currency that has been deposited via cashiers and/or other supervisory personnel for withdrawals, the frequency of armored car drop-offs of currency may be intermittent.

Image 406 illustrates reports 407 that may be generated showing various data such as the amount placed into cash recycler 102 along with the corresponding currency denominations. The reports 407 may also include information which may be used to determine when an armored car pickup should be scheduled.

The information stored in cash recycler 102 may be transmitted via network 120 to a financial institution for use in crediting or debiting various customer accounts. The retail customer may have access to the information through the financial institution's network. For example, image 408 depicts an enterprise employee accessing summary information concerning the businesses cash position as reported by the cash recyclers. The cash position of the enterprise may provide information to the enterprise employee directly via the interface or indirectly via another system authorize short term borrowing or investing, pay down credits lines, or request additional credit. Furthermore, the information may enable the enterprise employee to forecast future cash surpluses and shortages and/or perform other actives involving financial risk management.

Figure 5:
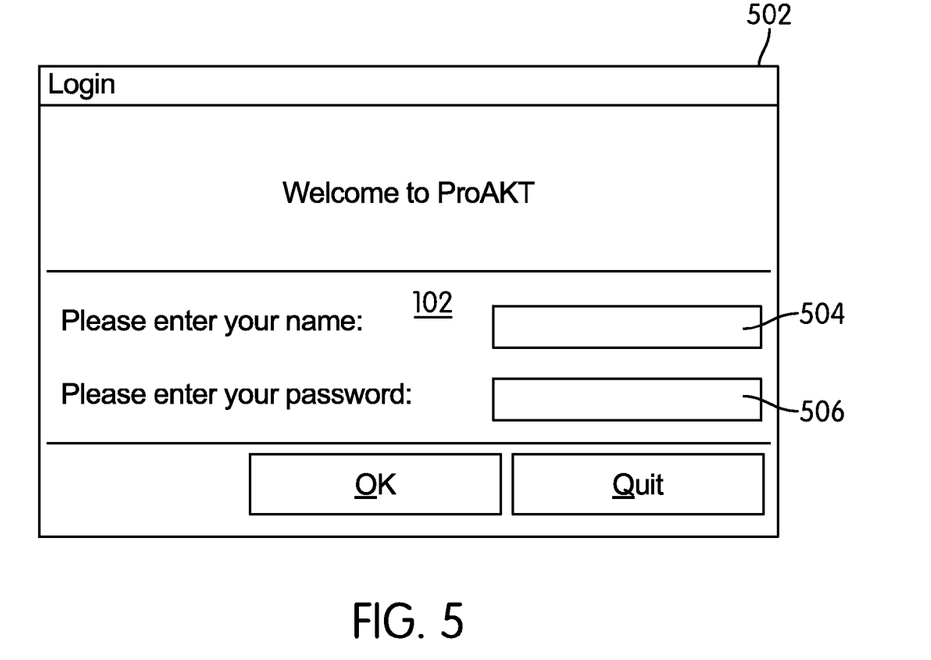
FIG. 5 illustrates an interface screen that may be utilized to access information regarding the current cash position of the enterprise in accordance with an aspect of the invention.

FIG. 5 illustrates an interface screen that an enterprise employee may utilize to access information regarding the current cash position of the enterprise in accordance with an aspect of the invention. In FIG. 5 an interface screen 502 may be used to request that a user enter a name 504 and password 506 to verify authorization to use the system. After access authorization has been granted the user is given access to the system.

Figure 6:
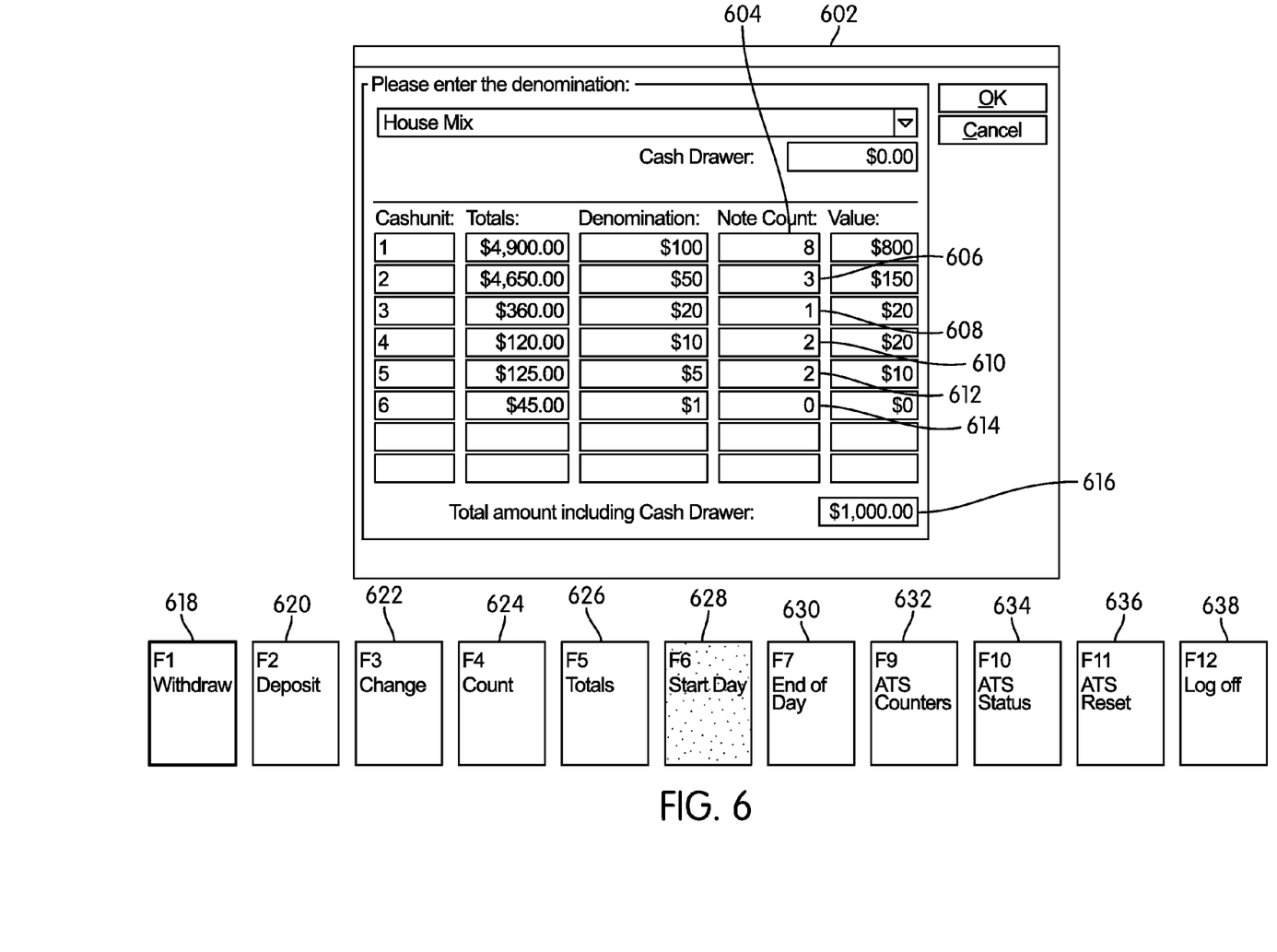
FIG. 6 illustrates a withdrawal screen that may be used in accordance with an aspect of the invention.

In an aspect of the invention, the user may decide to make a withdrawal to fill a cash register till. In FIG. 6, a withdrawal screen 602 may be presented to the user in accordance with an aspect of the invention. The user, through a series of dropdown boxes, may request that a certain total amount be withdrawn from the cash recycler in requested denominations. For example in screen 602, the user has requested that a total of $1,000 U.S. dollars 616 be withdrawn from cash recycler 102. The user has further requested that the cash recycler 102 dispense the $1,000 dollars in the form of eight $100 dollar bills (604), three $50 dollar bills (606), one $20 dollar bill (608), two $10 dollar bills (610) and two $5 dollar bills (612). Upon entry of the appropriate amount the user may select button 618 or shortcut key F1 to initiate the withdrawal. After the currency has been dispensed by the cash recycler 102, the cash recycler 102 may communicate with the financial institution or bank 130 to debit the appropriate enterprise accounts.

As shown in withdrawal screen 602 additional buttons or short cut keys corresponding to different functions may be displayed to the user. For example, the buttons may include a "Deposit" button 620, a "Change" button 622, a "Count" 624, a "Totals" button 626, a "Start Day" button 628, an "End of Day" button 630, an "ATS Counters" button 632, an "ATS Status" button 634, an "ATS Reset" button 636, and a "Log off" button 638.

Figure 7:
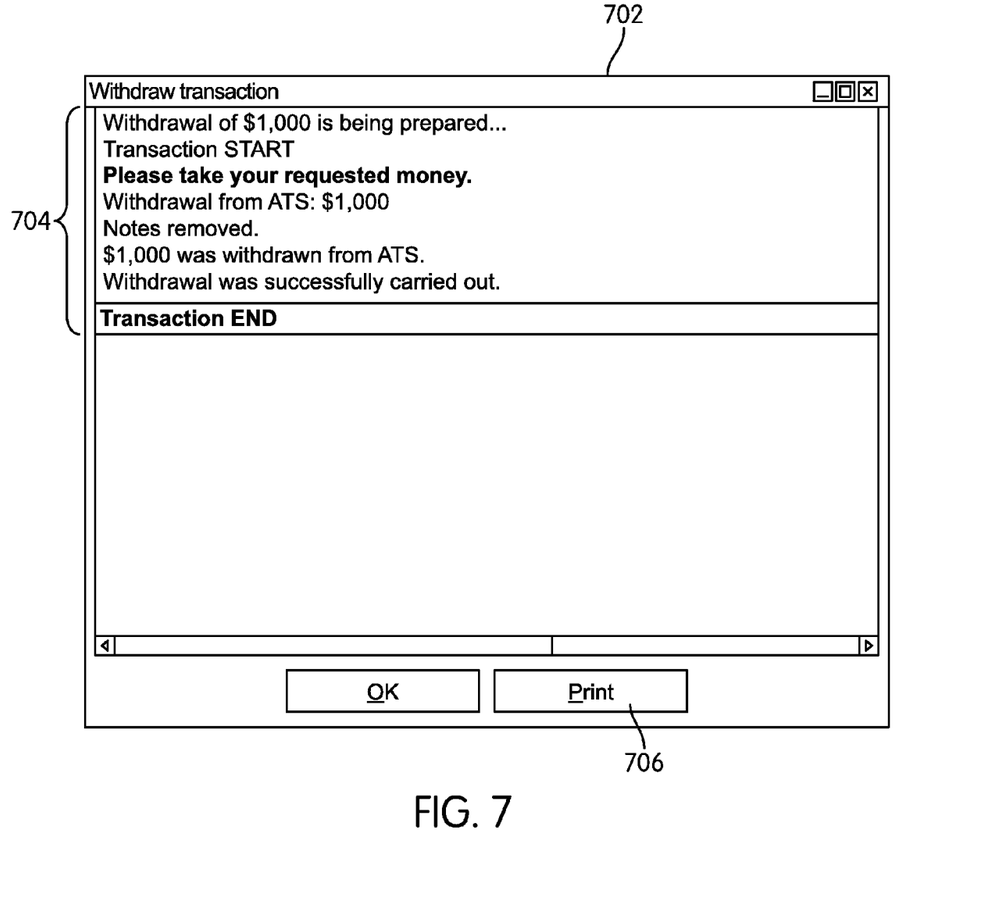
FIG. 7 illustrates a user interface screen in accordance with an aspect of the invention.

When the currency has been dispensed from the cash recycler 102, a displayed receipt may be shown to the user. For example, FIG. 7 illustrates a user screen 702 listing details in the form of receipt 704 for viewing by the user in accordance with an aspect of the invention. The user may request that the displayed receipt be printed 706.

In another aspect of the invention, the user may deposit a cash register till into cash recycler 102. The user may first count the currency and enter the amount into the cash recycler 102. The cash recycler may tally the currency as it is being deposited and also check for potential unauthorized reproductions of currency. After entry of the contents of the till into the cash recycler 102, the amount entered by the user may be compared to the amount counted by cash recycler 102. If the amounts are equal, the cash recycler 102 may communicate with the financial institution or bank 130 to credit the appropriate enterprise accounts. If a discrepancy exists, the user may be prompted to verify their count or a supervisor may be requested to intervene. Upon resolution, the cash recycler 102 may communicate with the financial institution or bank 130 to credit the appropriate enterprise account.

Figure 8:
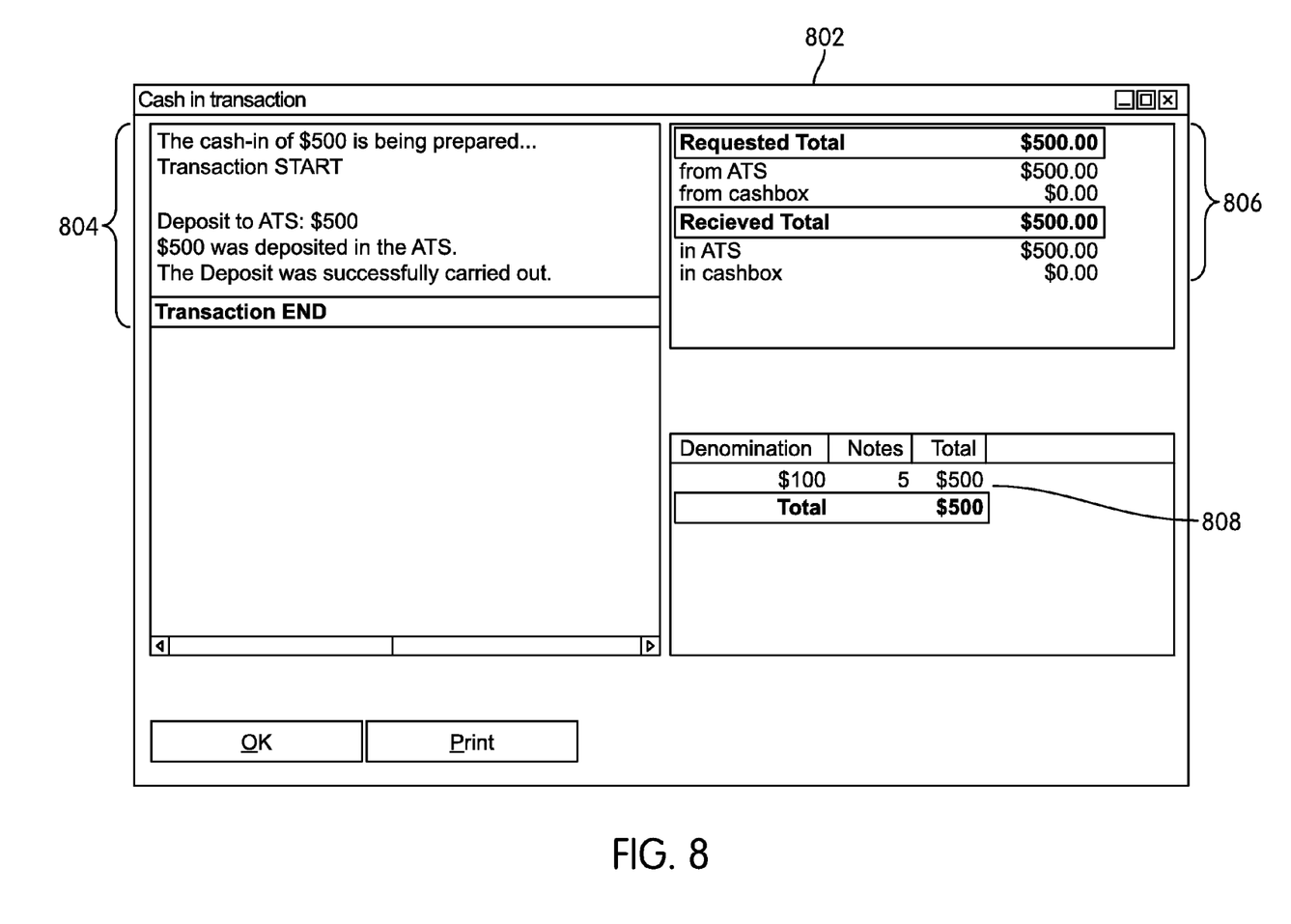
FIG. 8 illustrates another user interface screen that may be used in accordance with an aspect of the invention.

FIG. 8 illustrates a user screen 802 listing details for viewing by the user in accordance with an aspect of the invention. For example, user screen 802 may provide details of the transaction 804 along with detailed source amount information 806 and a breakdown of the currency denominations 808.

Figure 9:
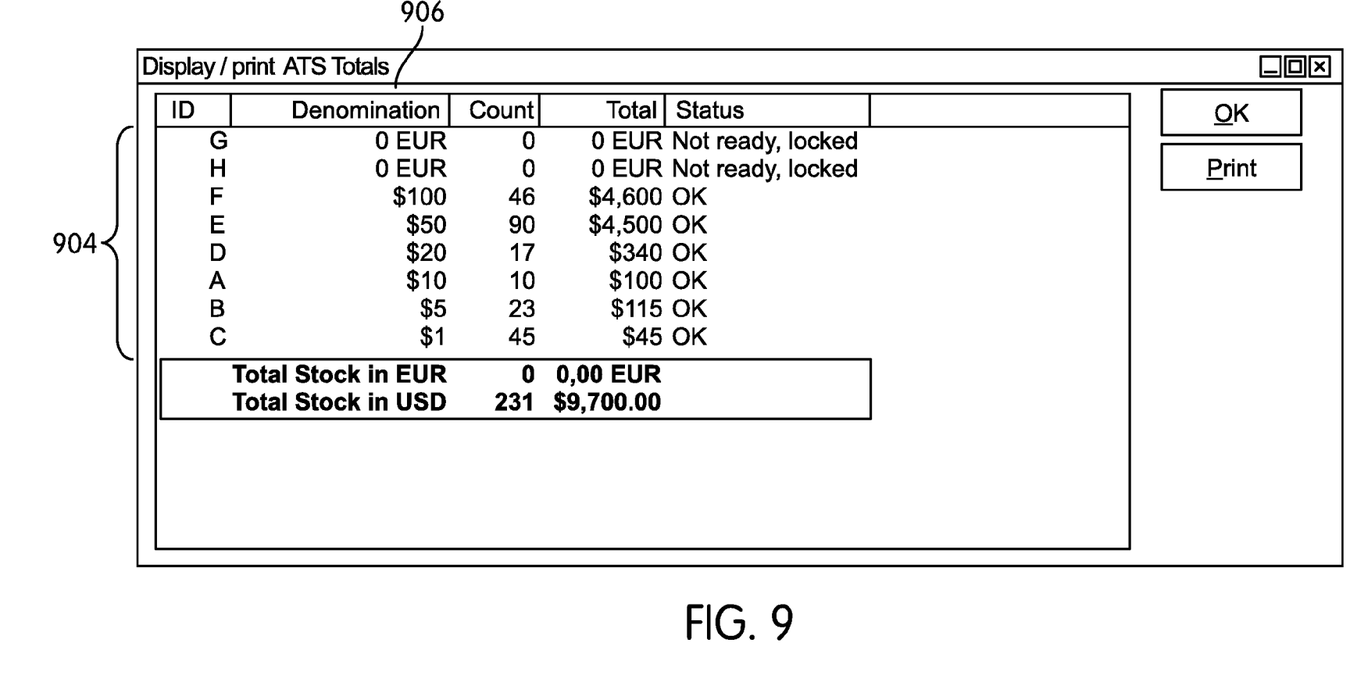
FIG. 9 illustrates a report that may be generated and used in accordance with an aspect of the invention.

In another aspect of the invention, the currency recycler 102 may also provide an inventory report 904 of the currency denominations 906 available to be dispensed upon request as illustrated in FIG. 9. The information may also include other types of currency currently available to be dispensed by cash recycler 102 such as foreign currency.

Figure 10:
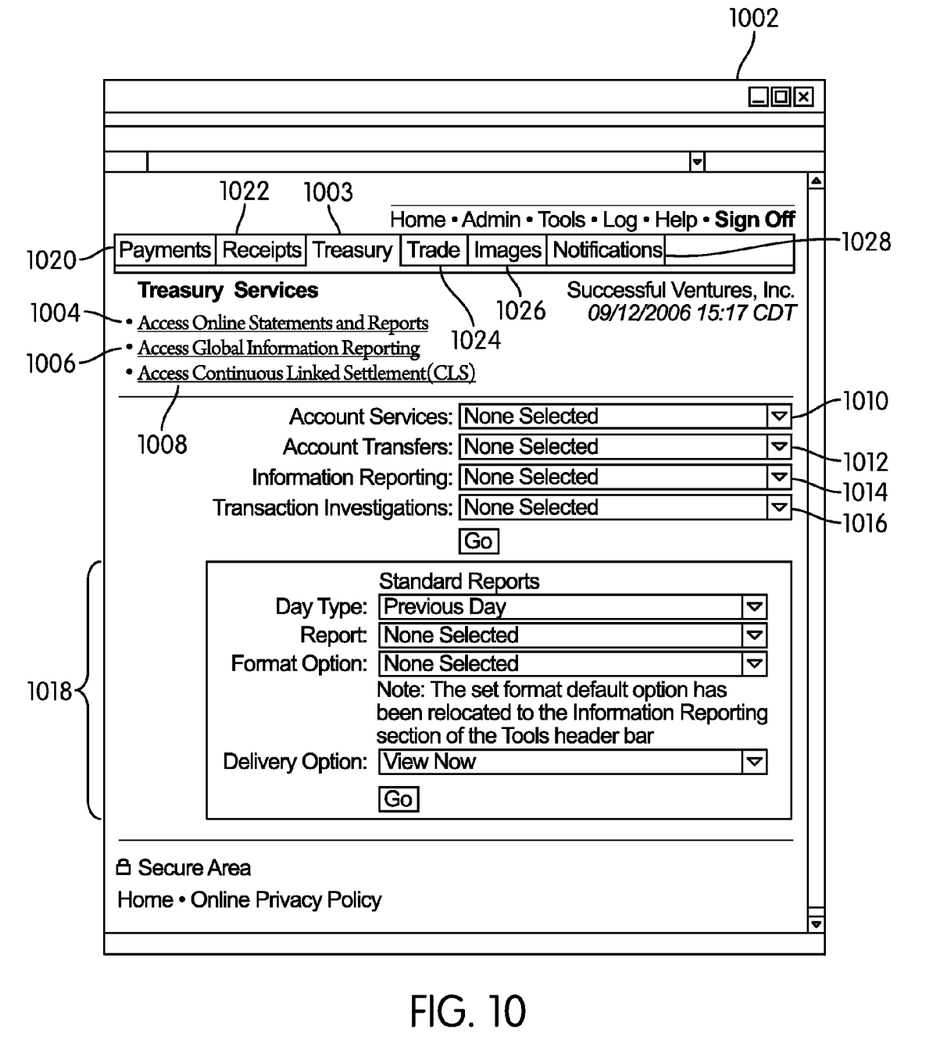
FIG. 10 illustrates a cash balance interface screen that may be used in accordance with an aspect of the invention.

FIG. 10 illustrates an interface screen, which may be used by an enterprise user to review cash balances at each of their stores or locations in accordance with an aspect of the invention. As shown in image 1002, the user may tab to a treasury screen 1003. The treasury screen 1003 may include a link to access online statements and reports 1004, global information reporting 1006 and continuous linked statements 1008. The user may have the ability to select a particular account service 1010, make an account transfer 1012, initialize information reporting 1014, and/or initialize a transaction investigation 1016.

In another aspect of the invention, standard reports 1018 may be available for review by the user. Additional detailed information may also be available by selecting different tabs such as a "Payments" tab 1020, a "Receipts" tab 1024, a "Trade" tab 1026, and a "Notification" tab 1028.

Figure 11:
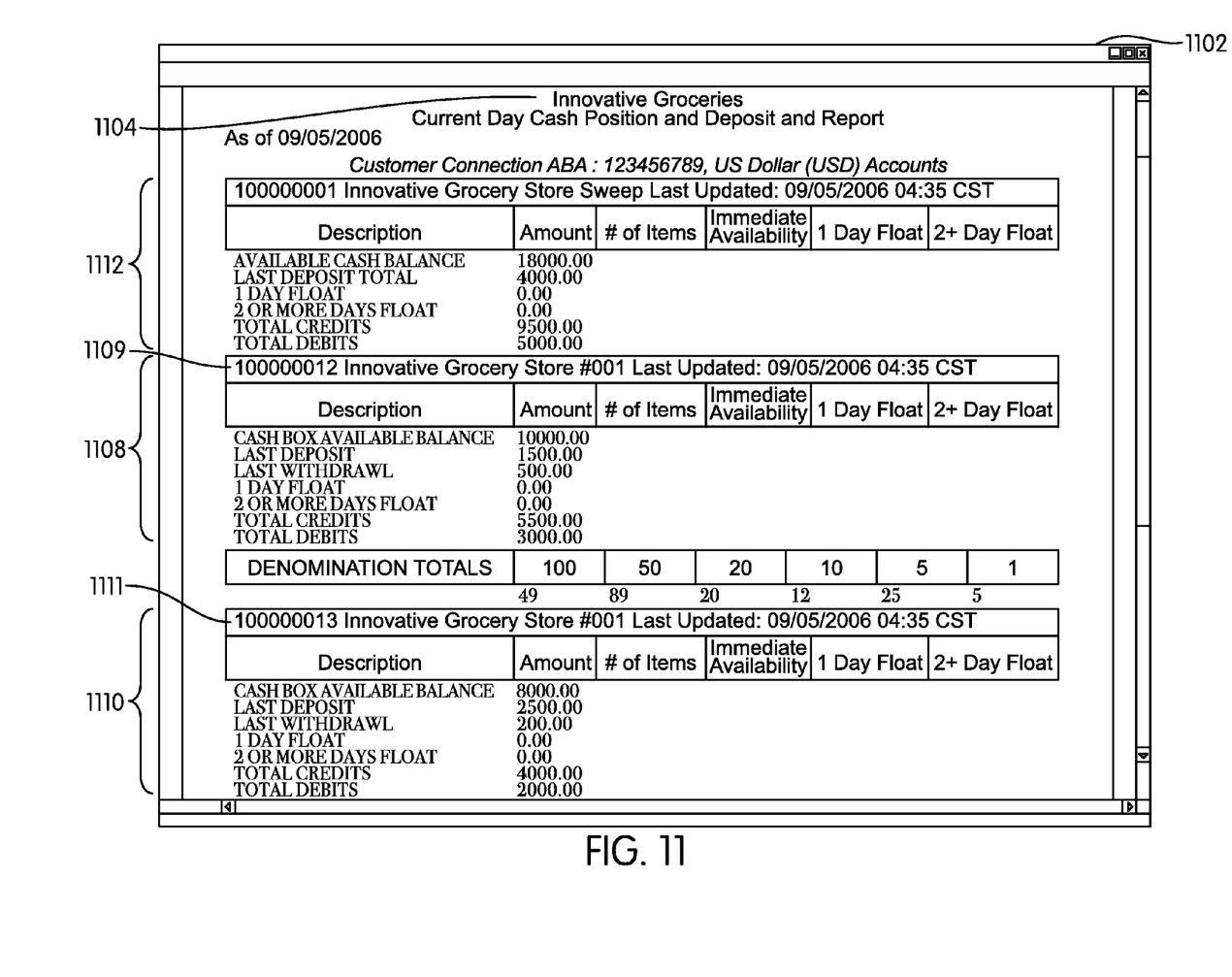
FIG. 11 illustrates a report that may be generated in accordance with an aspect of the invention.

FIG. 11 illustrates a report that may be generated in accordance with an aspect of the invention. In FIG. 11, a report is illustrated in image 1102. For example, the report may be for a grocery chain called "Store" 1104. The report may provide the user with the current day cash position for the grocery chain. For example, image 1102 illustrates a report which shows information 1108 and 1110 relating to cash positions at two stores 1109 and 1111. A total cash position for the grocery chain may also be provided along with other information at 1112.

The prompt recognition and acknowledgement of cash receipts may enable the enterprise to use the information to provide better funds management. For instance, the enterprise may decide to invest or pay down short term revolvers. Alternatively the enterprise may use the information to improve or mange cash change orders. The information may also be used in estimating and predicting future needs for lines of credit or in estimating future cash surpluses and/or shortages.

Figure 12:
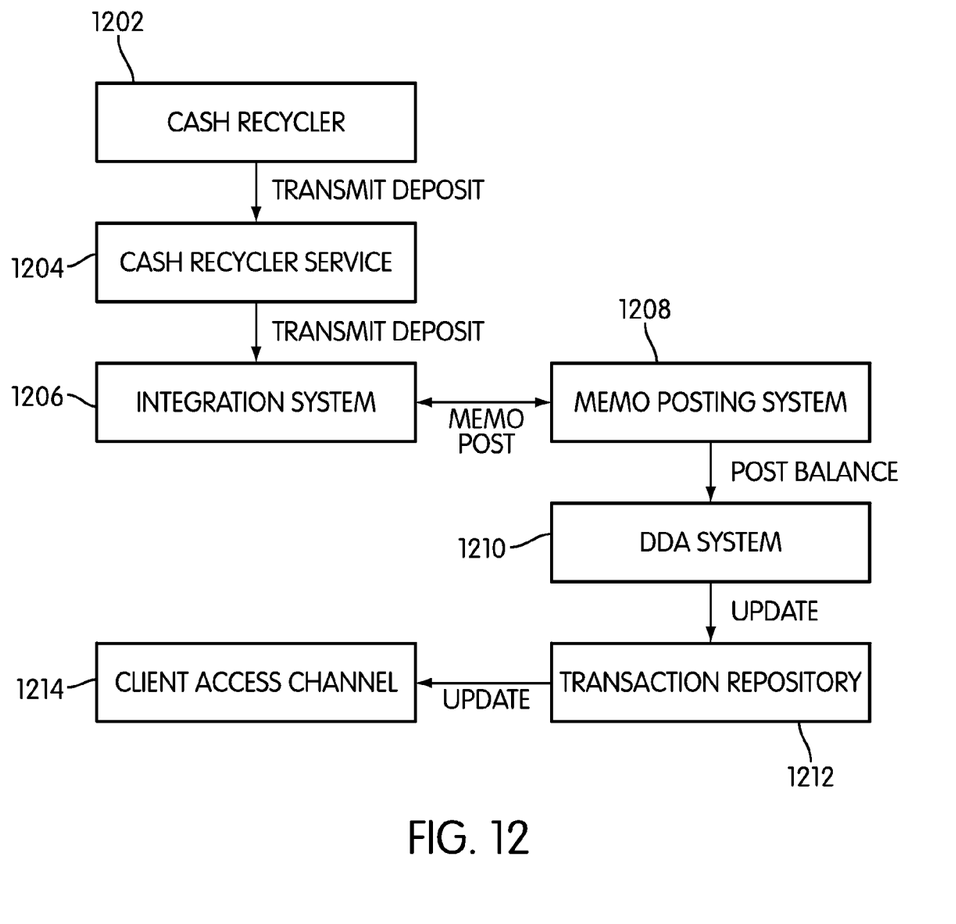
FIG. 12 illustrates a system configuration that may be used in accordance with an aspect of the invention.

FIG. 12 illustrates a system configuration that may be used in accordance with an aspect of the invention. In FIG. 12 a cash recycler 1202 may communicate information to cash recycler service 1204 located at a remote location. For example, cash recycler 1202 may communicate deposit and withdrawal information from an enterprise location to the remote cash recycler service 1204. The information may be routed through various networks such as the Internet to reach the cash recycler service. The cash recycler service 1204 may be located in the data center of a financial institution. The cash recycler service 1204 may communicate with an integration system 1206 which provides access to the financial systems and processes. The integration system 1206 may communicate with a memo posting system 1208 which may perform posting activity. The posting system 1208 may update the appropriate DDA (direct deposit account) system 1210 to reflect the balance changes in the enterprises account balances. The DDA system 1210 may also update a transaction repository 1212 for historical and intra-day reporting purposes. An enterprise employee may access information stored in the transaction repository 1212 through a client access channel 1214 via web browser. Those skilled in the art will realize that the financial institution may allow the enterprise user to access the information stored in the transaction repository via numerous alternative communication methods.

Figure 13:
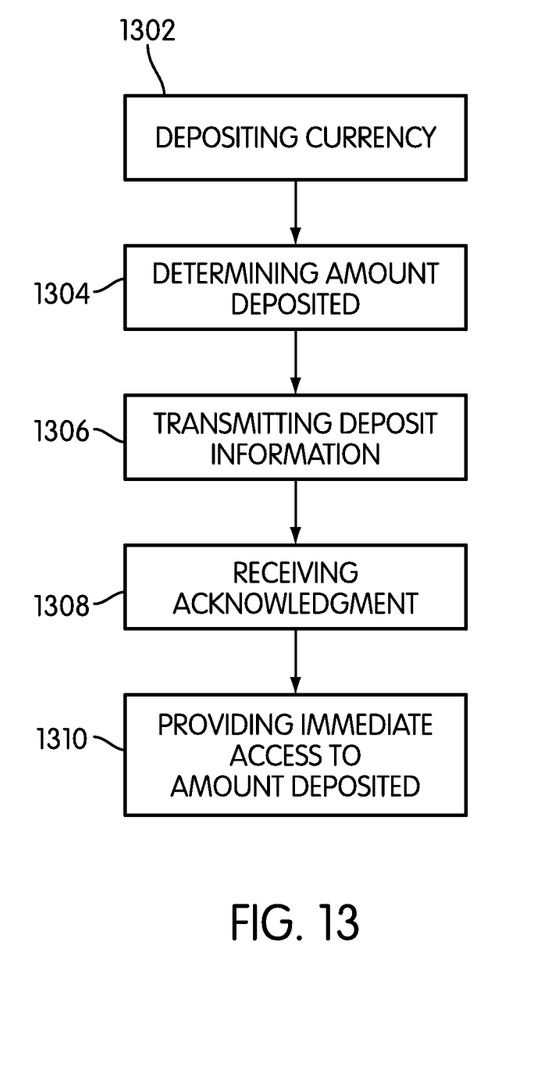
FIG. 13 illustrates a method of providing immediate availability to amount deposited in accordance with an aspect of the invention.

FIG. 13 illustrates a method of providing immediate credit to amount deposited in accordance with an aspect of the invention. In step 1302, an enterprise employee may deposit a first amount of currency in a cash recycler. The cash recycler may accept different forms of currency including bills, coins, and checks. The cash recycler in step 1304 may determine the amount of currency deposited by the enterprise employee. The cash recycler may query the enterprise employee to acknowledge the determined amount of currency to be deposited before proceeding. In step 1306, the cash recycler may transmit information relating to the amount of currency deposited to a financial institution. The financial institution upon receipt of the transmitted information may access the account of the enterprise and update the balance by the amount of the deposit. The financial institution may transmit an acknowledgement that the enterprise account has been updated. In step 1308, the cash recycler may receive an acknowledgement of the deposit. In step 1310, the enterprise may have immediate availability to the amount deposited to the account.

Although not required, one of ordinary skill in the art will appreciate that various aspects described herein may be embodied as a method, a data processing system, or as a computer-readable medium storing computer-executable instructions. Accordingly, those aspects may take the form of an entirely hardware embodiment, an entirely software embodiment or an embodiment combining software and hardware aspects. In addition, various signals representing data or events as described herein may be transferred between a source and a destination in the form of electromagnetic waves traveling through signal-conducting media such as metal wires, optical fibers, and/or wireless transmission media (e.g., air and/or space).

Aspects of the invention have been described in terms of illustrative embodiments thereof. Numerous other embodiments, modifications and variations within the scope and spirit of the appended claims will occur to persons of ordinary skill in the art from a review of this disclosure. For example, one of ordinary skill in the art will appreciate that the steps illustrated in the illustrative figures may be performed in other than the recited order, and that one or more steps illustrated may be optional in accordance with aspects of the disclosure.

We claim:

1. A system, comprising:
   a first cash recycler at a first retail location of a retail owner, the first cash recycler comprising:
      a first processor;
      a first communication interface; and
      a first memory storing computer-executable instructions that, when executed by the first processor, cause the first cash recycler to receive first currency and transmit, via the first communication interface, and to a bank server, one or more first recognition requests based on the first currency, wherein the one or more first recognition requests are configured to cause the bank server to apply an immediate credit for the first currency to one or more enterprise accounts associated with the retail owner;
   a second cash recycler at a second retail location of the retail owner, the second cash recycler comprising:
      a second processor;
      a second communication interface; and
      a second memory storing computer-executable instructions that, when executed by the second processor, cause the second cash recycler to receive second currency and transmit, via the second communication interface, and to the bank server, one or more second recognition requests based on the second currency, wherein the one or more second recognition requests are configured to cause the bank server to apply an immediate credit for the second currency to the one or more enterprise accounts associated with the retail owner; and
   the bank server comprising:
      a third processor;
      a third communication interface; and
      a third memory storing computer-executable instructions that, when executed by the third processor, cause the bank server to:
         receive, via the third communication interface, from the first cash recycler, the one or more first recognition requests;
         receive, via the third communication interface, from the second cash recycler, the one or more second recognition requests;
         determine, based on the one or more first recognition requests, a first real-time cash position of the first cash recycler at the first retail location, the first real-time cash position corresponding to a first amount of currency available to the retail owner at the first retail location;
         determine, based on the one or more second recognition requests, a second real-time cash position of the second cash recycler at the second retail location, the second real-time cash position corresponding to a second amount of currency available to the retail owner at the second retail location;
         generate, based on the first real-time cash position of the first cash recycler at the first retail location and the second real-time cash position of the second cash recycler at the second retail location, a report comprising information indicative of an overall cash position of the retail owner; and
         cause the report comprising the information indicative of the overall cash position of the retail owner to be displayed to the retail owner via at least one user interface.

2. The system of claim 1,
   wherein the first cash recycler is configured to receive the first currency from a first cash register till at the first retail location, and
   wherein the second cash recycler is configured to receive the second currency from a second cash register till at the second retail location.

3. The system of claim 2,
   wherein the first cash recycler is configured to receive a count from a user of the first cash recycler.

4. The system of claim 3,
   wherein the first cash recycler is configured to prompt the user of the first cash recycler to verify the count after receiving the first currency from the first cash register till if a discrepancy exists.

5. The system of claim 2,
   wherein the first cash recycler is configured to present a user interface comprising source amount information and a breakdown of currency denominations after receiving the first currency from the first cash register till.

6. The system of claim 1,
   wherein the first cash recycler is configured to present a user interface comprising an inventory report that identifies currency denominations available to be dispensed.

7. The system of claim 1, wherein the bank server is configured to present a user interface comprising a treasury screen, the treasury screen comprising one or more options to select an account service, make an account transfer, initialize information reporting, and initialize a transaction investigation.

* * * * *